United States Patent [19]

Aono et al.

[11] 4,375,252
[45] Mar. 1, 1983

[54] SHOE DRUM BRAKE

[75] Inventors: Masami Aono, Yokohama; Shinichi Izumi, Tokyo, both of Japan

[73] Assignee: Tokico, Ltd., Kanagawa, Japan

[21] Appl. No.: 295,313

[22] Filed: Aug. 24, 1981

Related U.S. Application Data

[63] Continuation of Ser. No. 91,494, Nov. 5, 1979, abandoned.

[30] Foreign Application Priority Data

Nov. 7, 1978 [JP] Japan ............................... 53/136909

[51] Int. Cl.³ ...................... F16D 51/12; F16D 65/56
[52] U.S. Cl. .......................... 188/79.5 P; 188/106 F; 188/205 A; 192/99 B; 192/111 A
[58] Field of Search .................. 188/79.5 P, 79.5 GE, 188/79.5 S, 205 A, 325, 106 A, 106 F; 192/300, 99 B, 111 A

[56] References Cited

U.S. PATENT DOCUMENTS 2,118,188  5/1938  Gallup ............................. 188/106 A
3,023,853  3/1962  Nawrot ...................... 188/106 A X
3,621,947  11/1971  Margetts ......................... 188/79.5 P
4,079,819  3/1978  Shirai ......................... 118/79.5 P X
4,167,990  9/1979  Steer et al. ....................... 188/205 A

FOREIGN PATENT DOCUMENTS

1005855  4/1957  Fed. Rep. of Germany ... 188/106 A

Primary Examiner—George E. A. Halvosa
Attorney, Agent, or Firm—Wenderoth, Lind & Ponack

[57] ABSTRACT

A shoe drum brake of the type including a pair of shoes, a first having a cylindrical portion, a second strut having external screw thread portion telescopically received in the cylindrical portion, an adjusting nut threadingly engaging with the screw thread portion of the second strut and abutting with the first strut, and an automatic shoe clearance adjusting mechanism associated with a hand brake lever, the mechanism comprises a supporting shaft pivotally connecting the hand brake lever with one end of either of the first and second struts, and an adjust lever for rotating the adjusting nut in association with the movement of the hand brake lever. A spring is provided to bias the automatic shoe clearance adjusting mechanism toward a backing plate.

7 Claims, 20 Drawing Figures

SHOE DRUM BRAKE

The present application is a continuation of U.S. application Ser. No. 091,494, filed Nov. 5, 1979, now abandoned.

BACKGROUND OF THE INVENTION

This invention relates to shoe drum brakes provided with an automatic shoe clearance adjusting mechanism.

A typical shoe drum brake means provided with automatic shoe clearance adjusting mechanisms comprises a pair of arcuate shoes, a first strut having a cylindrical portion provided with an open end, a second strut having an external screw thread portion telescopically received in the cylindrical portion of the first strut, an adjusting nut threadingly engaging with the screw thread portion of the second strut and abutting the open end of the cylindrical portion of the first strut, and an automatic shoe clearance mechanism associated with a hand brake lever. The mechanism includes a supporting shaft pivotally connecting one end of either of the first and second struts with the hand brake lever, and means for rotating the adjusting nut in association with the pivotal movement of the hand brake lever thereby adjusting the overall length of the first and second strut. The mechanism and the first and second struts extend between the pair of shoes with one end of the other of first and second struts being connected to one shoe and the mechanism being connected to the other shoe through the hand brake lever.

In the non-actuated condition of the hand brake lever or the shoe clearance adjusting mechanism, an assembly consisting of the first and second strut, the shoe clearance adjusting mechanism and the hand brake lever is floatingly supported in the brake, with the supporting shaft of the shoe clearance adjusting mechanism usually being supported on a backing plate. Therefore, there are problems, due to vibrations or the like, such that mutually engaging parts will wear, thereby reducing the durability of the brake, or a rattling noise will be generated during the running of the vehicle or the like.

SUMMARY OF THE INVENTION

An object of the invention is to solve the above-described problems and, according to the invention, a spring is provided to bias the shoe clearance adjusting mechanism toward the backing plate.

BRIEF DESCRIPTION OF THE DRAWINGS

The present invention may be better understood from the following description taken in connection with the accompanying drawings in which.

DETAILED DESCRIPTION OF THE PREFERRED EMBODIMENTS

Figure 1:
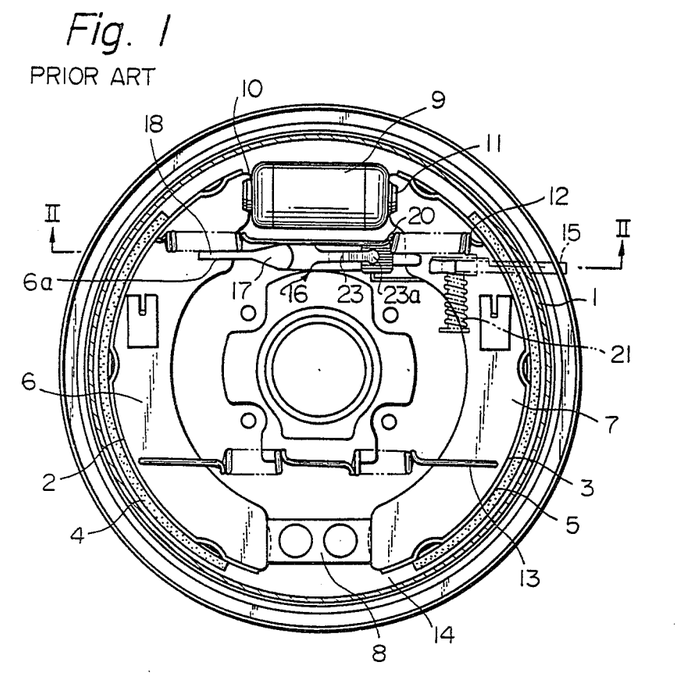
FIG. 1 is a front view of a typical prior art shoe drum brake.
Figure 2:
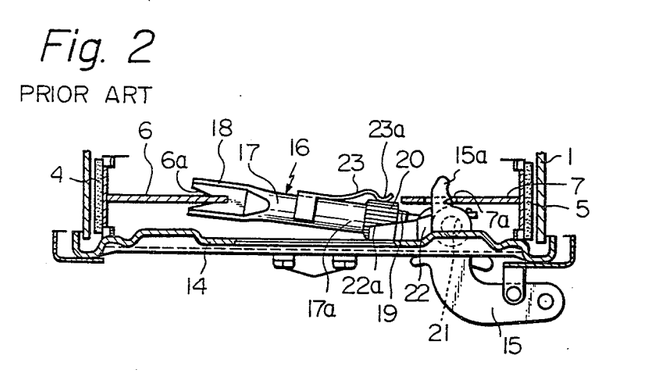
FIG. 2 is a sectional view taken along line II—II in FIG. 1.

The shoe drum brake illustrated in FIGS. 1 and 2 comprises a pair of arcuate shoes consisting respectively of backing plates 2 and 3 with linings 4 and 5 being bonded thereon and facing the inside surface of a drum 1 which is rotatable integrally with a wheel (not shown). Webs 6 and 7 are mounted on the backing plates 2 and 3. One end of each of the respective webs 6 and 7 are supported on an anchor 8, and the other ends thereof abut respectively the pistons 10 and 11 of a wheel cylinder 9. Two return springs 12 and 13 extend between webs 6 and 7 and act to bias the shoes inwardly or in the direction separating from the drum 1. Illustrated at 14 is a backing plate parallel to the webs, and at 15 a generally L-shaped hand brake lever.

A tip end portion 15a of the hand brake lever 15 is received in a through hole 7a in the web 7, and a cut-out portion 6a formed in the web 6 engages with a fork portion 18 formed on one end of a first strut 17.

The first strut 17 has on one end a cylindrical or hollow portion 17a which telescopically receives an external screw thread portion of a second strut 19. An adjusting nut 20 threadingly engages with the thread portion of the second strut 19 and abuts the open end of the cylindrical portion 17a of the first strut 17. The other end of the second strut 19 is pivotally connected to a supporting shaft 21 which is, in the drawing, integrally provided with the hand brake lever 15, and thus the second strut 19 is pivotally connected to the hand brake lever 15, and when the hand brake lever 15 is actuated through a cable or the like (not shown) the webs 6 and 7 are pressed against the drum 1 through the one end 15a of the hand brake lever 15 engaging with the web 7, through second strut 19, the adjusting nut 20, and the first strut 17 with the fork portion 18 thereof engaging with the web 6.

For automatically adjusting the clearance between the shoe and the drum, there is provided a mechanism which will hereinafter be explained. An adjusting lever 22 is journalled on the supporting shaft 21 and one end portion 22a of the adjust lever 22 engages with ratchet teeth formed on the outer circumference of the adjusting nut 20. A coil spring (FIG. 1) acts between the supporting shaft 21 and the adjusting lever 22 so that the adjusting lever 22 normally follows the rotational movement of the hand brake lever around the axis of the supporting shaft 21. Thus, when the hand brake lever 15 is actuated the adjusting lever 22 rotates the adjusting nut 20 (when the shoe clearance is so large that the adjusting nut 20 is not tightly abutting with the first strut 17) thereby displacing the second strut 19 outwardly of the first strut 17 thus adjusting automatically the shoe clearance. Illustrated at 23 is a rotation resisting member for applying a suitable rotational resistance on the adjusting nut 20, and it is provided with a tip portion 23a resiliently engaging with the outer circumference of the adjusting nut 20. The supporting shaft 21, the adjusting lever 22 and the related coil spring constitute the brake shoe clearance automatic adjusting mechanism according to the prior art and the present invention.

In the prior art shoe drum brake having the aforesaid construction, an assembly consisting of first and second struts 17 and 19, and the hand brake lever 15 floatingly extends between the webs 6 and 7 when the hand brake lever is not actuated, and thus there are problems such that the first strut 17, the end portion 15a of the hand brake lever 15, and a flanged end of the supporting shaft 21 impactingly abut respectively the web 6, web 7 and the backing plate 14 thereby generating a rattling noise or wearing the mutually contacting surfaces, thus reducing the durability of the parts.

According to a first embodiment of the present invention illustrated in FIGS. 3-6, there is provided a leaf spring 24 between the lower surface 7b or the surface of the brake web 7 opposing the backing plate 14 and the automatic shoe clearance adjusting mechanism to bias the mechanism against the backing plate 14.

The leaf spring 24 comprises a portion 24a resiliently engaging the upper surface, or the surface adjacent to the surface 7b of the web 7, of the flange portion or the head portion 21a of the supporting shaft 21, a portion 24b resiliently engaging the upper surface of a roller 25 supporting the supporting shaft 21, end portions 24c and 24d resiliently engaging the surface 7b of the web 7, and an opening 24f through which extends the end portion 15a of the hand brake lever 15. A recess 24a' is formed in the portion 24a for receiving therein the head portion 21a of the supporting shaft 21 and stops 24b' are formed on the portion 24b for clamping the roller 25, whereby the leaf spring 24 is positively located with respect to the supporting shaft 21. Thus, the supporting shaft 21 resiliently engages the backing plate 14 through the head portion 24a and the roller 25 since the web 7 is not displaced in the upward direction as viewed in FIGS. 2 and 4.

Figure 3:
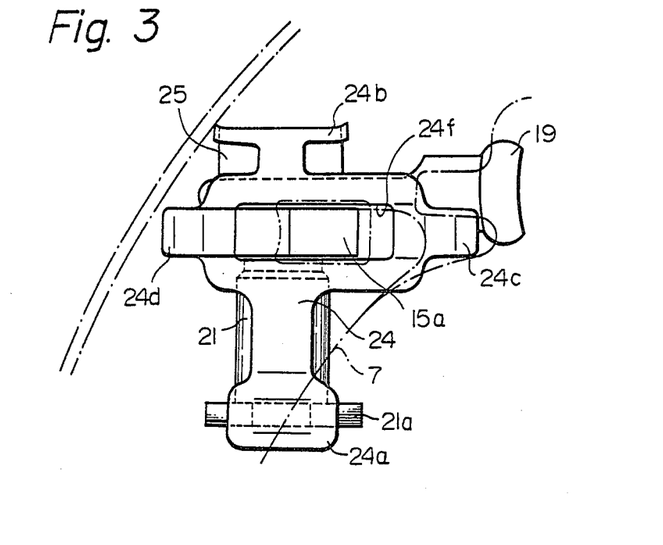
FIG. 3 is a front view showing the essential portion of a first embodiment of the invention.
Figure 4:
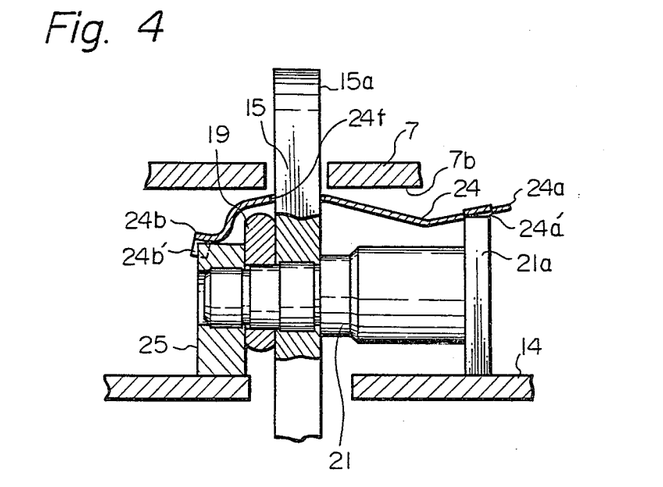
FIG. 4 is a side view as viewed from the left side in FIG. 3.
Figure 5:
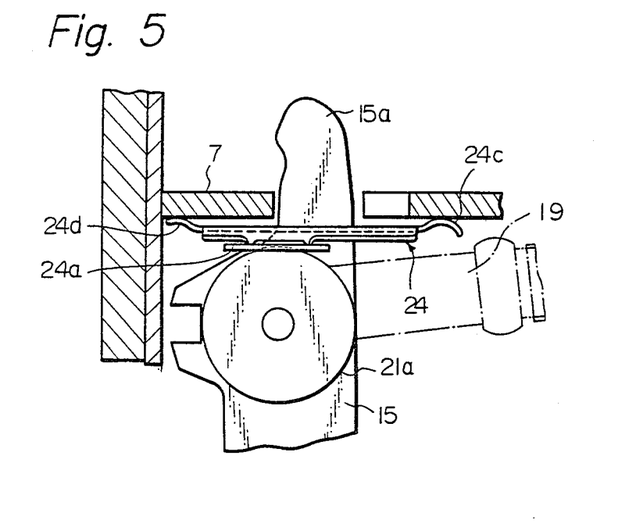
FIG. 5 is a side view as viewed from the bottom in FIG. 3.
Figure 6:
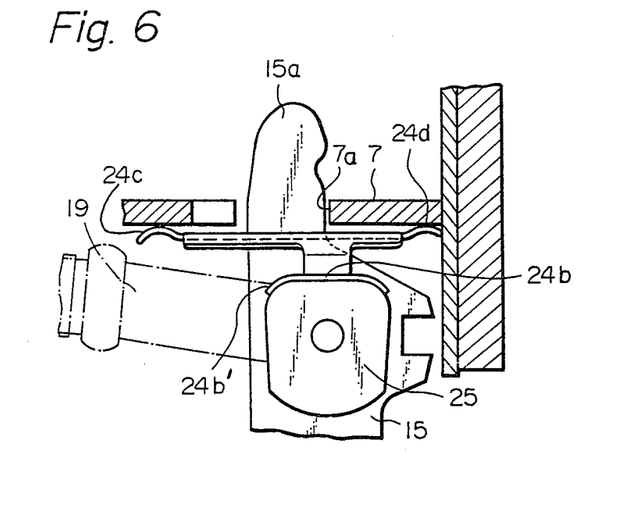
FIG. 6 is a side view as viewed from above in FIG. 3.

The portions 24a and 24b or the portions 24c and 24d may be omitted by modifying the peripheral portion of the opening 24f so as to resiliently engage with the supporting shaft 21 or with the lower surface 7b of the web 7.

Figure 7:
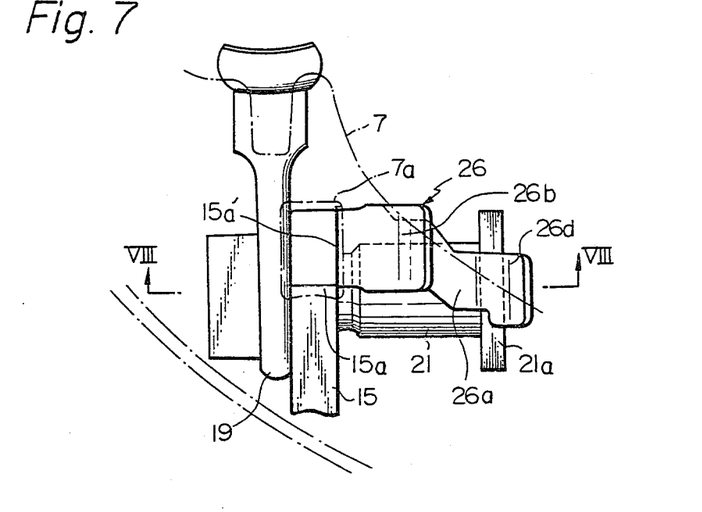
FIG. 7 is a front view showing the essential portion of a second embodiment of the invention.
Figure 8:
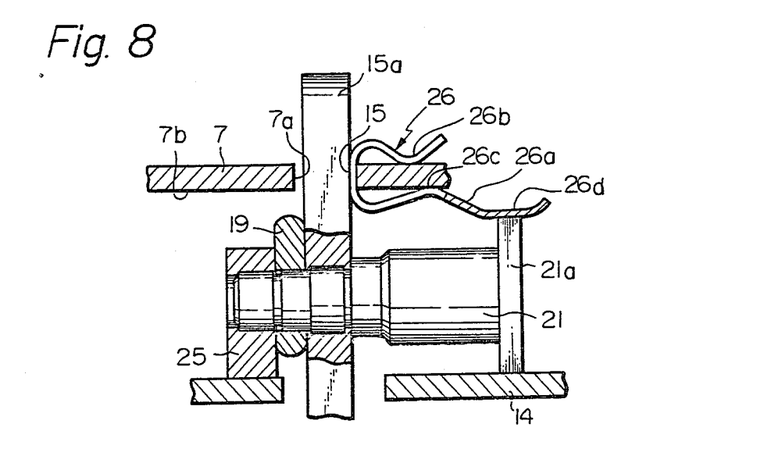
FIG. 8 is a sectional view taken along line VIII—VIII in FIG. 7.
Figure 9:
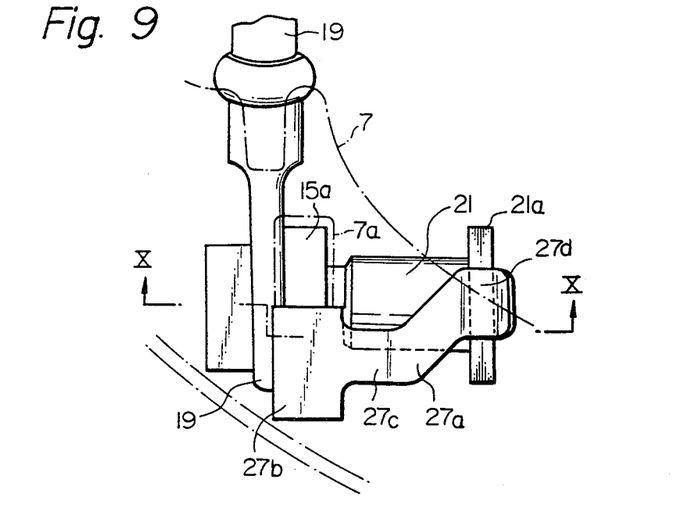
FIG. 9 is a front view showing the essential portion of a third embodiment of the invention.
Figure 10:
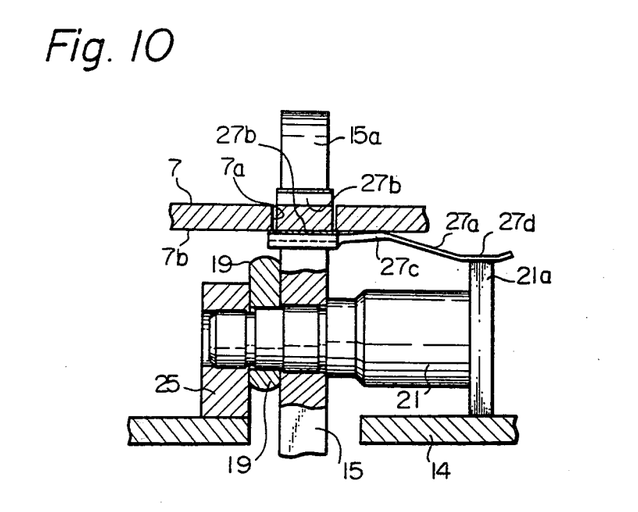
FIG. 10 is a sectional view taken along line X—X in FIG. 9.
Figure 11:
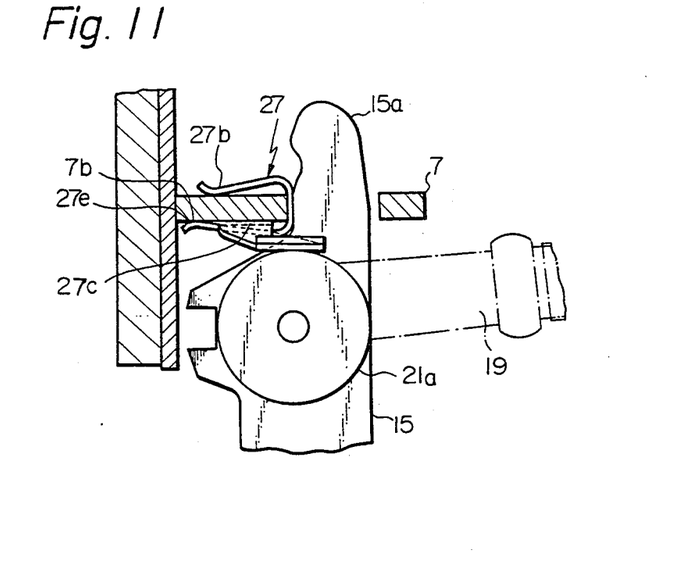
FIG. 11 is a side view as viewed from the right side in FIG. 10.
Figure 12:
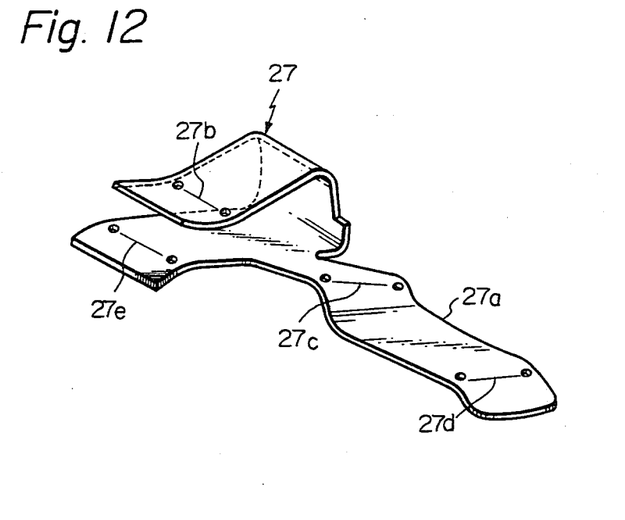
FIG. 12 is a perspective view of the spring illustrated in FIG. 9.
Figure 13:
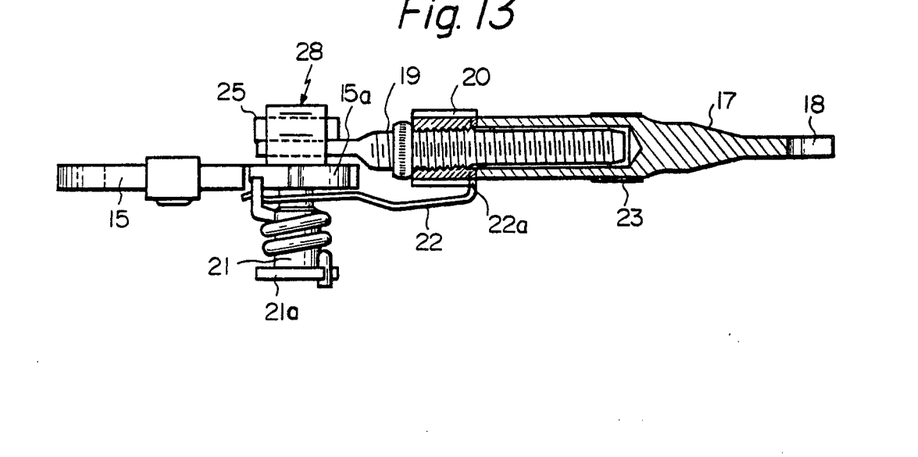
FIG. 13 is a plan view showing the essential portion of a fourth embodiment of the invention.
Figure 14:
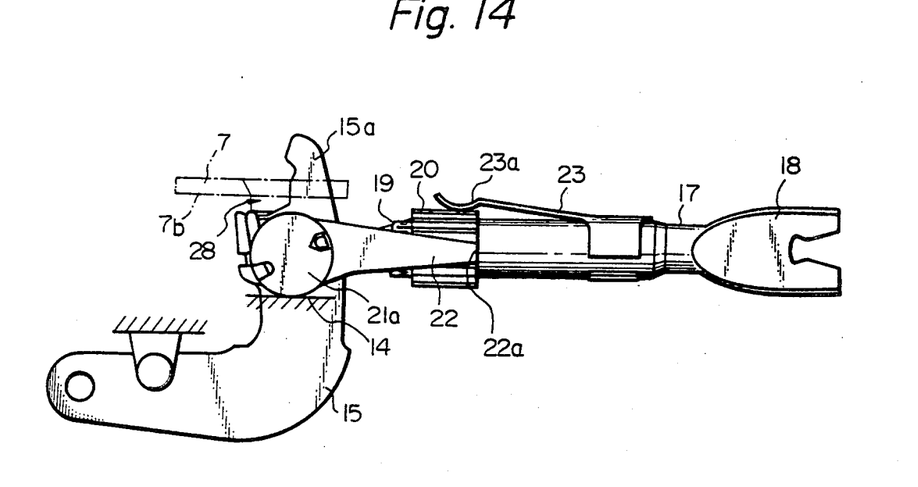
FIG. 14 is a side view as viewed from below in FIG. 13.
Figure 15:
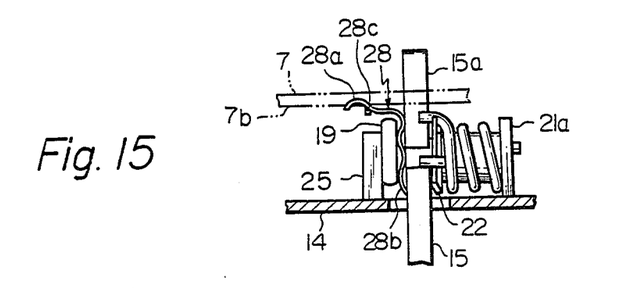
FIG. 15 is a side view as viewed from the left side in FIG. 13.

A second embodiment of the invention is shown in FIGS. 7 and 8, wherein a leaf spring 26 passes through the opening 7a of the web 7 and is resiliently clamped to the web 7 on the upper and lower surfaces thereof by portions 26b and 26c as clearly shown in FIG. 8. The spring 26 further includes downwardly extending portion 26a extending integrally from portion 26c for resiliently engaging with the head portion 21a of the supporting shaft 21. The portions 26b and 26c coact to locate the leaf spring 26 with respect to the web 7 and the portions 26a and 26d bias the automatic shoe clearance adjusting mechanism toward the backing plate 14. Thus floating movement of the hand brake lever 15 and struts 17 and 19 can reliably be controlled. In FIG. 7, the web 7 is illustrated in chain lines to clarify the positional relationship between the leaf spring 26 and the web 7.

A third embodiment of the invention is shown in FIGS. 9-12. Similar to the second embodiment, the leaf spring 27 in the third embodiment includes portions 27b and 27e resiliently engaging the upper and lower surfaces of the web 7, and downwardly extending portion 27a having a portion 27d resiliently engaging with the head portion 21a of the supporting shaft 21. However there is provided a portion 27c on the portion 27a for engaging with the lower surface 7b of the web 7 at a position separate from the portion 27e. Thus, the clamping and locating function are carried out by portions 27b and 27e, and the portions 27c and 27d act solely to bias the automatic shoe clearance adjusting mechanism toward the backing plate 14. Thus, the leaf spring 27 is reliably located in its position and the automatic shoe clearance adjusting mechanism is reliably biassed against the backing plate 14.

Figure 16:
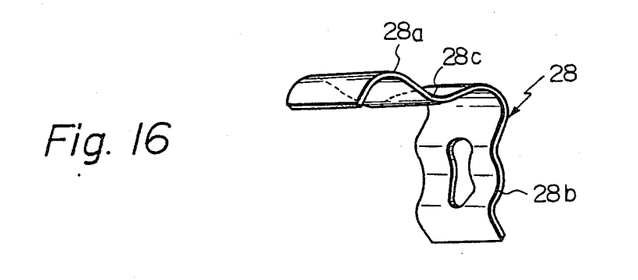
FIG. 16 is a perspective of the spring illustrated in FIG. 15.
Figure 17:
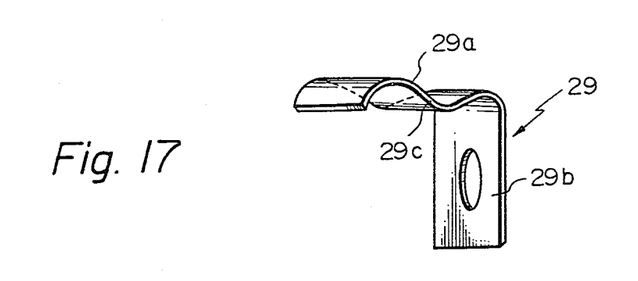
FIG. 17 is a perspective view of a spring modified from the spring of FIG. 16.

A fourth embodiment of the invention is shown in FIGS. 13-16. As clearly shown in FIGS. 15 and 16, a generally L-shaped leaf spring 28 is mounted on the supporting shaft 21 which passes through an opening (FIG. 16) formed in one arm 28b of the L-shaped spring. The tip end portion 28a of the other arm resiliently engages with the lower surface 7b of the web 7 whereby the leaf spring 28 resiliently bias the supporting shaft 21 against the backing plate 14. The one arm 28b is corrugated as shown in FIG. 16 and is interposed between the hand brake lever 15 and the second strut 19 thus preventing both members 15 and 19 from sticking which might occur due to dust or the like, and also, absorbing axial play of the parts mounted on the supporting shaft 21. However, the leaf spring 28 may be modified to have a flat arm as shown in FIG. 17.

Figure 18:
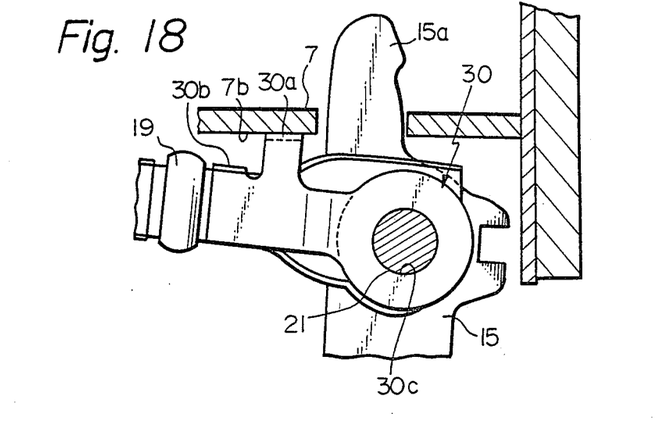
FIG. 18 is an enlarged view showing a fifth embodiment of the invention.
Figure 19:
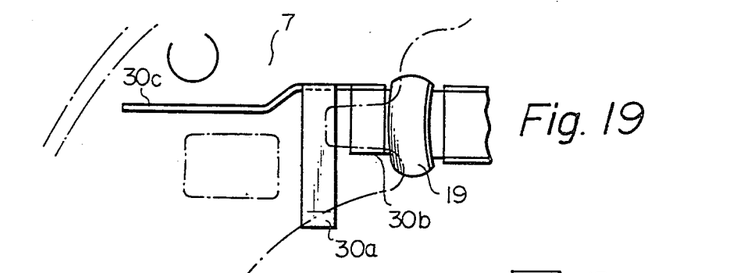
FIG. 19 is a view as viewed from above in FIG. 18.
Figure 20:
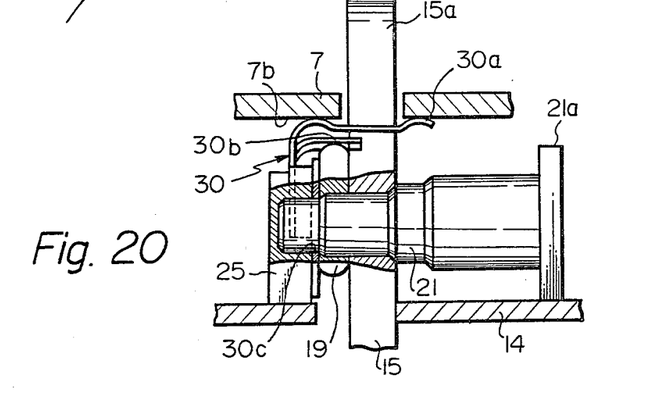
FIG. 20 is a side view as viewed from the right side in FIG. 18.

A fifth embodiment of the invention is shown in FIGS. 18-20. A leaf spring 30 is mounted on the supporting shaft 21 which passes through an opening 30c formed in one arm of the leaf spring 30. The spring 30 extends along the second strut 19 and includes transversely (downwardly as viewed in FIG. 19) extending portions 30a and 30b. The portion 30a resiliently engages the lower surface 7b of the web 7 thereby pressing the supporting shaft 21 downwardly against the backing plate 14 as shown in FIG. 20, and the portion 30b resiliently engages the upper surface of the second strut 19.

As described heretofore, a spring is, according to the invention, provided to bias the automatic shoe clearance adjusting mechanism against the backing plate, so that floating movement or the like of the mechanism which would be caused from vibrations or the like can reliably be avoided thus eliminating rattling noise, reducing the wear in mutually contacting parts and improving the durability.

In the embodiments, a leaf spring is interposed between the web 7 and the automatic web clearance adjusting mechanism, so that the arrangement has a very simple construction.

In the second and third embodiments, the leaf spring is mounted on the web 7, and the leaf spring is reliably mounted at a desired location in the brake whereby a desired biassing force can reliably be obtained.

When the leaf spring is mounted on the supporting shaft with an opening being formed in the leaf spring for passing the supporting shaft therethrough, the leaf spring can easily and reliably be mounted in the brake, and the configuration of the spring can be simplified, and moreover the assembling operation can be simplified. Further, the leaf spring may be corrugated at the peripheral portion of the opening whereby the axial play of parts mounted on the supporting shaft can be absorbed, thus reducing the number of parts.

In the embodiments, a leaf spring is interposed between the web 7 and the supporting shaft 21 to press the supporting shaft 21 against the backing plate 14. However, the invention is not limited to the disclosed embodiments. For example, a spring may be interposed between the web 6 and the first strut 17 so as to bias, through the second strut 19, the supporting shaft 21 against the backing plate 14. Alternatively, a spring may be provided between the backing plate 14 and the supporting shaft 21 to pull the supporting shaft 21 toward the backing plate 14.

What is claimed is:

1. A shoe drum brake engagable with a rotating drum comprising:
    a backing plate;
    a pair of arcuate shoes movable toward and away from a drum and from each other, each having a web thereon parallel to said backing plate and spaced from the other, the web of one of said pair of arcuate shoes having aperture therein;
    a strut assembly having two ends, including a first strut having a cylindrical portion with one end open, a second strut having an external screw thread portion on one end telescopically received in said cylindrical portion of said first strut, and an adjusting nut threadingly engaging said screw thread portion of said second strut and abutting said open end of said cylindrical portion of said first strut so as to determine the overall length of said strut assembly, one of said two ends of said strut assembly being connected to the web of the other of said pair of arcuate shoes;
    a hand brake lever with one end passing through said aperture in said web of said one of said pair of arcuate shoes;
    a supporting shaft normally resting on said backing plate and pivotally mounting said brake lever thereto, said supporting shaft being connected to the other of said two ends of said strut assembly;
    means for rotating said adjusting nut in association with the pivotal movement of said hand brake lever; and
    a spring having clamping portions resiliently engaging opposite sides of said web of said one of said pair of arcuate shoes and a portion connecting said clamping portions and extending through said aperture, said spring further having an extending portion resiliently biasing said supporting shaft against said backing plate.

2. A shoe drum brake as in claim 1, wherein said extending portion extends integrally from a first one of said clamping portions.

3. A shoe drum brake as in claim 1 or claim 2, wherein said extending portion comprises a first free end resiliently engaging said supporting shaft.

4. A shoe drum as in claim 3, wherein a second one of said clamping portions comprises a second free end resiliently engaging said web of said one of said pair of arcuate shoes.

5. A shoe drum brake as in claim 1 or claim 2, wherein a second one of said clamping portions comprises a second free end resiliently engaging said web of said one of said pair of arcuate shoes.

6. A shoe drum brake as in claim 1 or claim 2, wherein a first one of said clamping portions and said extending portion are interposed between said web of said one of said arcuate shoes and said supporting shaft.

7. A shoe drum brake as in claim 1 or claim 2, wherein said connecting portion of said spring is engagable with said lever.

* * * * *